(12) United States Patent
Jung

(10) Patent No.: US 12,432,671 B2
(45) Date of Patent: Sep. 30, 2025

(54) NAN-BASED CLUSTER MERGING METHOD AND ELECTRONIC DEVICE FOR SUPPORTING SAME

(71) Applicant: Samsung Electronics Co., Ltd., Gyeonggi-do (KR)

(72) Inventor: Buseop Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 17/735,473

(22) Filed: May 3, 2022

(65) Prior Publication Data

US 2022/0264282 A1    Aug. 18, 2022

Related U.S. Application Data

(63) Continuation of application No. PCT/KR2020/015110, filed on Nov. 2, 2020.

(30) Foreign Application Priority Data

Nov. 4, 2019    (KR) .................. 10-2019-0139243

(51) Int. Cl.
  *H04W 8/00*    (2009.01)
  *H04W 4/80*    (2018.01)
  *H04W 56/00*   (2009.01)
  *H04W 84/18*   (2009.01)

(52) U.S. Cl.
  CPC ............ *H04W 56/001* (2013.01); *H04W 4/80* (2018.02); *H04W 8/005* (2013.01); *H04W 84/18* (2013.01)

(58) Field of Classification Search
  CPC ..... H04W 56/001; H04W 4/80; H04W 8/005; H04W 84/18
  See application file for complete search history.

(56) References Cited

U.S. PATENT DOCUMENTS

| 9,380,119 B2 | 6/2016 | Kasslin et al. |
| 9,781,586 B2 | 10/2017 | Jung et al. |
| 9,838,864 B2 | 12/2017 | Zhou et al. |
| 9,949,063 B2 | 4/2018 | Yong et al. |

(Continued)

FOREIGN PATENT DOCUMENTS

| EP | 2892259 A1 | 8/2015 |
| KR | 10-2016-0062602 A | 6/2016 |

(Continued)

OTHER PUBLICATIONS

Korean Office Action dated Mar. 25, 2024.

*Primary Examiner* — Gbemileke J Onamuti
(74) *Attorney, Agent, or Firm* — Cha & Reiter, LLC

(57) ABSTRACT

An electronic device according to one embodiment of the present invention can be configured to: perform a first adjustment on at least some of the functions related to the discovery of first communication; receive a first signal transmitted from at least one external electronic device on the basis of second communication having a protocol different from that of the first communication; acquire, from the first signal, second information about a second cluster associated with the at least one external electronic device; and determine a second adjustment on at least some of the functions associated with the discovery of the first communication, on the basis of the first information about the first cluster and the second information. Other various embodiments identified through the specification are possible.

15 Claims, 11 Drawing Sheets

(56) References Cited

U.S. PATENT DOCUMENTS

| | | | |
|---|---|---|---|
| 10,341,942 B2 | 7/2019 | Jung et al. | |
| 10,880,824 B2 | 12/2020 | Jung et al. | |
| 2015/0131529 A1 | 5/2015 | Zhou et al. | |
| 2016/0127883 A1 | 5/2016 | Zhou et al. | |
| 2016/0150537 A1 | 5/2016 | Jung et al. | |
| 2016/0353233 A1 | 12/2016 | Yong et al. | |
| 2019/0098483 A1 | 3/2019 | Qi et al. | |
| 2019/0150062 A1 | 5/2019 | Bradley et al. | |
| 2019/0239149 A1 | 8/2019 | Jung et al. | |
| 2021/0185505 A1 | 6/2021 | Qi et al. | |

FOREIGN PATENT DOCUMENTS

| | | |
|---|---|---|
| KR | 10-2016-0063041 A | 6/2016 |
| KR | 10-2016-0086370 A | 7/2016 |

NAN-BASED CLUSTER MERGING METHOD AND ELECTRONIC DEVICE FOR SUPPORTING SAME

CROSS-REFERENCE TO RELATED APPLICATION(S)

This application is a Continuation of and claims priority under 35 U.S.C. § 120 to PCT International Application No. PCT/KR2020/015110, which was filed on Nov. 2, 2020, and claims priority to Korean Patent Application No. 10-2019-0139243, filed on Nov. 4, 2019, in the Korean Intellectual Property Office, the disclosure of which are incorporated by reference herein their entirety.

BACKGROUND

Technical Field

One or more embodiments of the instant disclosure generally relate to technology of merging NAN clusters.

Description of Related Art

A neighbor awareness networking (NAN) proximity service may be able to configure a set of electronic devices which may be referred to as a cluster. According to the NAN specification, an electronic device synchronized with a first cluster may discover an adjacent second cluster via a scanning operation and may perform synchronization with the second cluster. For example, the electronic device synchronized with the first cluster may receive a signal (e.g., discovery beacon or synchronization beacon signal) from the second cluster, and may perform synchronization with the second cluster if grade information of the second cluster included in the signal is higher (greater) than grade information of the first cluster. As such, since the electronic device synchronized with the first cluster performs synchronization with the adjacent second cluster, merging between the first cluster and the second cluster may be implemented.

SUMMARY

A periodic scanning operation of the electronic device performed to discover the second cluster may cause excessive power consumption of the electronic device. Therefore, a scheme for adjusting the scanning operation interval of the electronic device to be longer has been proposed. However, in this case, discovery of the second cluster through the scanning operation may be delayed.

Furthermore, when an electronic device functions as a master device or non-master sync device according to the NAN specification, the electronic device is required to share information of the second cluster with another electronic device synchronized with the first cluster after determining to synchronize with the second cluster. As the second cluster information is shared, adjustment of the scanning operation interval of the electronic device may be associated with a delay in sharing of the second cluster information due to a delay in discovery of the second cluster and due to a delay in synchronization with the second cluster of the other electronic device synchronized with the first cluster.

An electronic device according to an embodiment may include a wireless communication circuit and a processor operatively connected to the wireless communication circuit.

According to an embodiment, the processor may synchronize with a first cluster having first information based on execution of first communication using the wireless communication circuit, perform first adjustment on at least a portion of a function related to execution of the first communication, transmit a first signal including at least one piece of first information related to the first cluster based on execution of second communication using the wireless communication circuit, receive a second signal transmitted from at least one external electronic device based on execution of the second communication using the wireless communication circuit, identify at least one piece of second information included in the second signal, and determine second adjustment on at least the portion of the function related to execution of the first communication based on whether the at least one piece of the first information and the at least one piece of the second information correspond to each other.

An NAN-based cluster merging method of an electronic device according to an embodiment may include synchronizing with a first cluster based on execution of first communication using a wireless communication circuit, performing first adjustment on at least a portion of a function related to execution of the first communication, transmitting a first signal including at least one piece of first information related to the first cluster based on execution of second communication using the wireless communication circuit, receiving a second signal transmitted from at least one external electronic device based on execution of the second communication using the wireless communication circuit, identifying at least one piece of second information included in the second signal, and determining second adjustment on at least the portion of the function related to execution of the first communication based on whether the at least one piece of first information and the at least one piece of second information correspond to each other.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to the description of the drawings, the same reference numerals may be used to refer to the same or corresponding elements.

DETAILED DESCRIPTION

Certain embodiments of the disclosure may provide an NAN-based cluster merging method capable of resolving power consumption issue due to continuous activation of a scanning function. The merging method may control activation or deactivation of the scanning function of an electronic device. An electronic device supporting the same is also disclosed.

According to an embodiment, an electronic device may control activation or deactivation of a scanning function based on information received from an external electronic device, and may reduce, based on this control, power consumption due to continuous activation of the scanning function.

Hereinafter, certain embodiments of the present invention will be described in detail with reference to the accompanying drawings. However, it should be understood that the present invention is not limited to specific embodiments, but rather includes various modifications, equivalents and/or alternatives of certain embodiments of the present invention.

Figure 1:
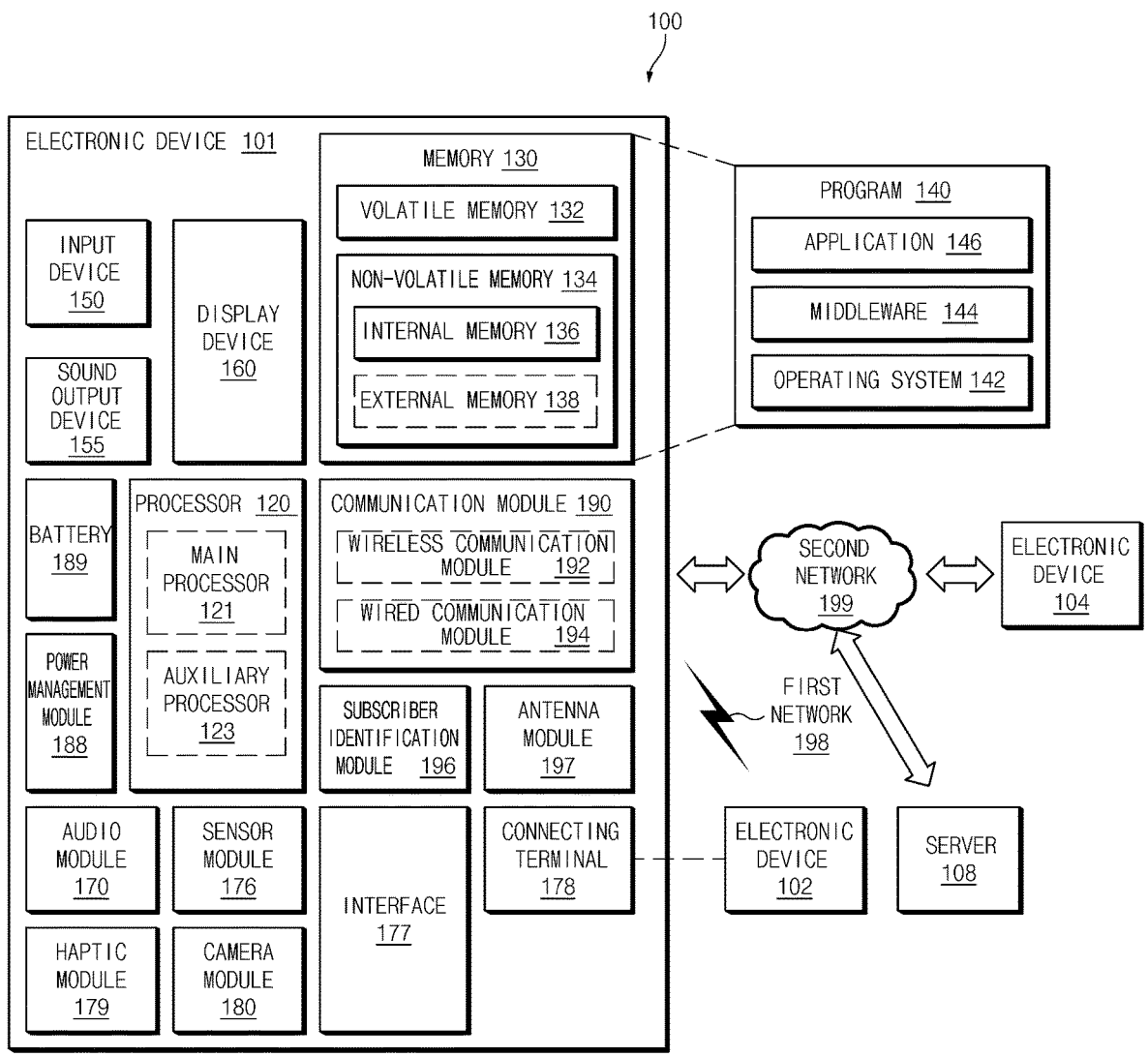
FIG. 1 a diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, a communication operation environment of an electronic device according to an embodiment will be described with reference to FIGS. 2 to 6.

Figure 2:
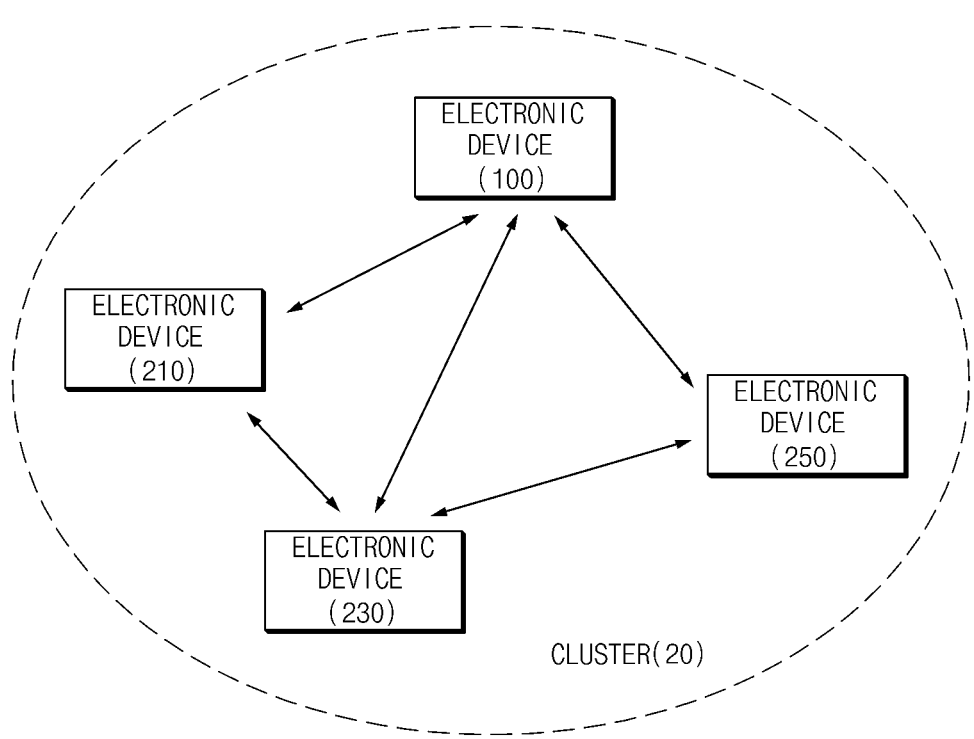
FIG. 2 is a diagram illustrating a cluster in which electronic devices are synchronized according to an embodiment.

FIG. 2 is a diagram illustrating a cluster in which electronic devices are synchronized according to an embodiment.

According to an embodiment, the term "cluster" mentioned below may include a neighbor awareness networking (NAN) cluster according to the NAN specification. The NAN cluster, for example, may represent a set of one or more electronic devices performing transmission or reception of data or signals based on a proximity network. According to the NAN specification, at least one electronic device synchronized with the NAN cluster may use one or more mutually identical parameters (e.g., discovery window, interval period between discovery windows, beacon interval, and/or NAN channel) for operation of the proximity network or proximity service.

Referring to FIG. 2, an electronic device 101 (e.g., the electronic device 101 of FIG. 1) according to an embodiment may operate low-power proximity communication (e.g., first communication) of the NAN specification using a wireless communication circuit (or wireless communication module) (e.g., the wireless communication module 192 of FIG. 1). In order to operate the low-power proximity communication of the NAN specification, the electronic device 101 may construct a network (e.g., the first network 198 of FIG. 1) with at least one other electronic device 102a, 102b, and/or 102c and may configure a cluster (cluster A) to interact with each other.

In an embodiment, the electronic device 101 may transmit and/or receive data or a signal related to operation of the proximity service through a discovery window period that is a communication period synchronized with the at least one other electronic device 102, 102b, and/or 102c. For example, the electronic device 101 may transmit and/or receive a sync beacon including at least one piece of information related to synchronization with the at least one other electronic device 102a, 102b, and/or 102c during the discovery window period. Alternatively, the electronic device 101 may transmit and/or receive a service discovery frame related to service advertisement or service information sharing during the discovery window period.

Figure 3:
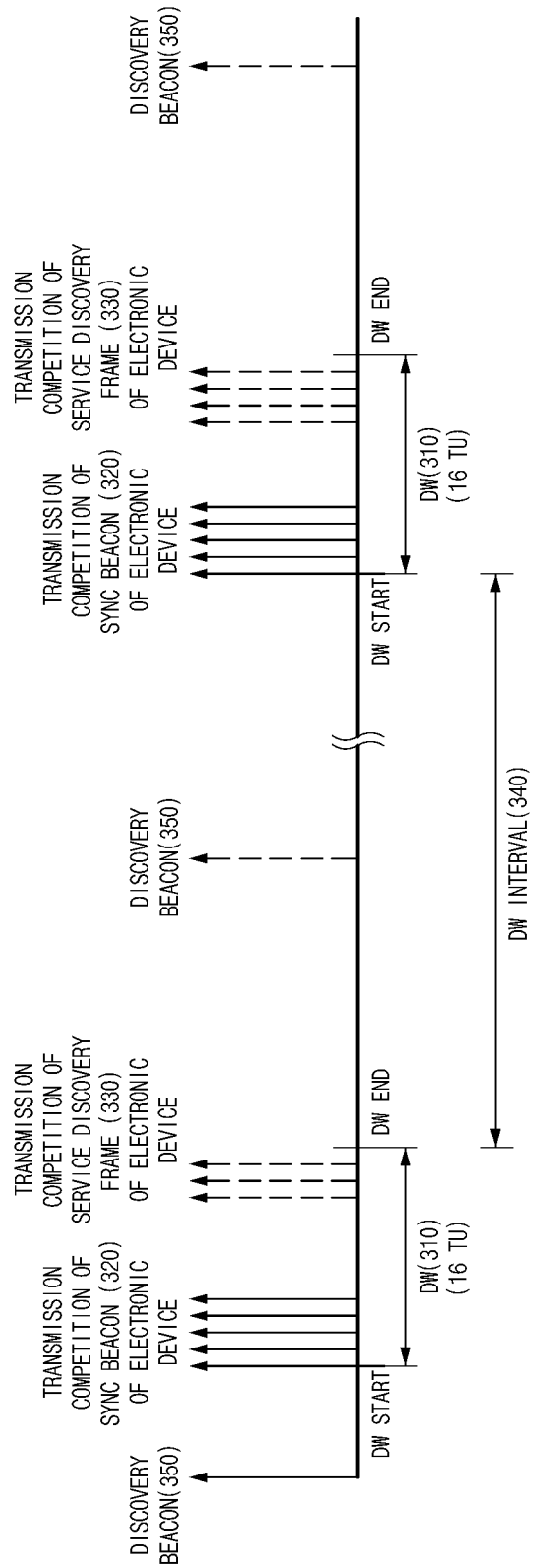
FIG. 3 is a diagram illustrating a time clock with which electronic devices are synchronized according to an embodiment.

FIG. 3 is a diagram illustrating a time clock of a cluster in which electronic devices are synchronized according to an embodiment.

According to an embodiment, electronic devices (e.g., 101, 102a, 102b, and/or 102c of FIG. 2) synchronized with a cluster (e.g., the cluster A of FIG. 2) mentioned below may transmit and/or receive data or a signal through a sync channel (e.g., channel 6) according to the NAN specification.

Referring to FIG. 3, the electronic device 101, 102a, 102b, and/or 102c synchronized with a cluster (e.g., cluster A) may be synchronized with a time clock of a specific electronic device defined as a master device. According to an embodiment, the electronic devices 101, 102a, 102b, and/or 102c synchronized with a cluster (e.g., cluster A) may transmit and/or receive at least one of a sync beacon 320 and a service discovery frame 330 within a period 310 of a discovery window DW that occupies 16 time units according to the NAN specification and is present at an interval of 512 time units on the time clock. In an embodiment, transmission of the sync beacon 320 and the service discovery frame 330 may be performed based on competition or contention between the electronic devices 101, 102a, 102b, and/or 102c synchronized with a cluster (cluster A).

According to the NAN specification, the sync beacon 320 may be transmitted by a specific electronic device defined as the master device or non-master sync device among the electronic devices 101, 102a, 102b, and/or 102c synchronized with a cluster (cluster A). In an embodiment, the sync beacon 320 may function as a signal for maintaining synchronization (e.g., time clock synchronization) between the electronic devices 101, 102a, 102b, and/or 102c synchronized with a cluster (cluster A). In relation to this operation, the sync beacon 320 may include at least one piece of information used for synchronization between the electronic devices 101, 102a, 102b, and/or 102c. For example, the sync beacon 320 may include at least one of a frame control (FC) field indicating a function (e.g., beacon) of a signal, a broadcast address, a media access control (MAC) address of an electronic device that has transmitted the sync beacon 320, a cluster (cluster A) identifier, a sequence control field, a time stamp for a beacon frame, a beacon interval field indicating an interval between start points of the discovery window DW periods 310, and capability information of an electronic device that has transmitted the sync beacon 320. In an embodiment, at least one electronic device which receives the sync beacon 320 may maintain synchronization with at least one other electronic device synchronized with a cluster (cluster A) based on reception of the sync beacon 320. In certain embodiments, the sync beacon 320 may further include an information element related to a proximity network, where the information element may include, for example, content of a proximity service that may be provided through the proximity network.

In an embodiment, the service discovery frame 330 may function as a signal for advertising a proximity service between the electronic devices 101, 102a, 102b, and/or 102c synchronized with a cluster (cluster A) and sharing information related to the proximity service based on a proximity network. According to the NAN specification, the service discovery frame 330 may include various fields, and may be implemented as a vender specific public action frame. For example, the service discovery frame 330 may include at least one of a category field and an action field, and may further include an information element related to the proximity network. In an embodiment, at least one electronic device which receives the service discovery frame 330 may discover the proximity service advertised by an electronic device that has transmitted the service discovery frame 330, and may obtain information related to the discovered proximity service.

According to an embodiment, within the electronic devices 101, 102a, 102b, and/or 102c synchronized with a cluster (e.g., cluster A), a specific electronic device functioning as the master device may transmit a discovery beacon 350 in a period 340 (e.g., interval period between the plurality of discovery window DW periods 310) outside the discovery window DW period 310. In an embodiment, the discovery beacon 350 may function as a cluster (cluster A) advertisement signal transmitted so that another electronic device not participating in the cluster (cluster A) may discover the cluster (cluster A). For example, the other electronic device not participating in the cluster (cluster A) may discover the cluster (cluster A) by detecting the discovery beacon 350 transmitted from a master electronic device synchronized with the cluster (cluster A) by performing passive scan, and may determine whether to synchronize with the cluster (cluster A). In relation to this operation, the discovery beacon 350 may include at least one piece of information for synchronizing with a cluster (cluster A). For example, the discovery beacon 350 may include at least one of a frame control (FC) field indicating a function (e.g., beacon) of a signal, a broadcast address, a media access control (MAC) address of an electronic device that has transmitted the discovery beacon 350, a cluster identifier (e.g., identifier of the cluster A), a sequence control field, a time stamp for a beacon frame, a beacon interval field indicating a transmission interval of the discovery beacon 350, and capability information of an electronic device that has transmitted the discovery beacon 350. In an embodiment, the discovery beacon 350 may further include an information element related to the proximity network. The information element included in the discovery beacon 350 may include, for example, grade information of the cluster (cluster A).

$$\text{Master Rank} = \text{Master Preference} * 2^{56} + \text{Random Factor} * 2^{48} + MAC[5] * 2^{40} + \ldots + MAC[0] \quad \text{[Equation 1]}$$

Equation 1 may represent a master rank, which is referred to in determination of the grade of a cluster (cluster A). According to an embodiment, the master rank may be configured with factors such as a master preference (e.g., values of 0 to 128), random factor (e.g., values of 0 to 255), and a media access control (MAC) address (e.g., interface address of a NAN electronic device). According to the NAN specification, the master rank according to the sum of the factors may be calculated for each of the electronic devices 101, 102a, 102b, and/or 102c synchronized with the cluster (cluster A), and a specific electronic device having a relatively high master rank may be designated as the master device. Alternatively, the master rank may represent the magnitude or level of a cluster (cluster A) grade. For example, when the master rank of a master electronic device synchronized with the cluster (cluster A) is relatively higher (or greater) than the master rank of another master electronic device synchronized with another cluster, the grade of the cluster (cluster A) may be regarded to be relatively higher than the grade of the other cluster.

In certain embodiments, the grade of a cluster (cluster A) may be determined by the master rank calculated using only the master preference in the factors that can be used to configure the master rank. If the master preference used when determining the grade of a cluster (cluster A) and the master preference used when determining the grade of another cluster have the same value, the grade relationship between the cluster (cluster A) and the other cluster may be determined by a master rank calculated by further using at least one of the other factors that can be used to configure the master rank, for example, the random factor and the media access control (MAC) address as shown above. In certain embodiments, the grade of a cluster (cluster A) may also be determined based on at least one of the number of the electronic devices 101, 102a, 102b, and/or 102c synchronized with the cluster (cluster A), the number of proximity services provided by the cluster (cluster A), and a security level of the cluster (cluster A) regardless of the master rank. For example, the cluster (cluster A) may be determined to have a high (or great) grade when the number of electronic devices synchronized with the cluster (cluster A) is large, the number of proximity services provided by the cluster (cluster A) is large, and/or the security level of the cluster (cluster A) is high (or great).

According to an embodiment, each of the electronic devices 101, 102a, 102b, and/or 102c synchronized with a cluster (cluster A) may operate in a wake state or sleep state based on mutually synchronized time clocks. For example, the electronic devices 101, 102a, 102b, and/or 102c synchronized with a cluster (cluster A) may operate in the wake state in the discovery window DW period 310 and operate in the sleep state in a period other than the discovery window DW period 310, for example, the interval period 340 between the discovery window DW periods 310, in order to reduce power consumption. According to certain embodiments, the electronic devices 101, 102a, 102b, and/or 102c synchronized with a cluster (cluster A) may operate a different communication scheme other than the low-power proximity communication of the NAN specification in the interval period 340 between the plurality of discovery window DW periods 310.

Figure 4:
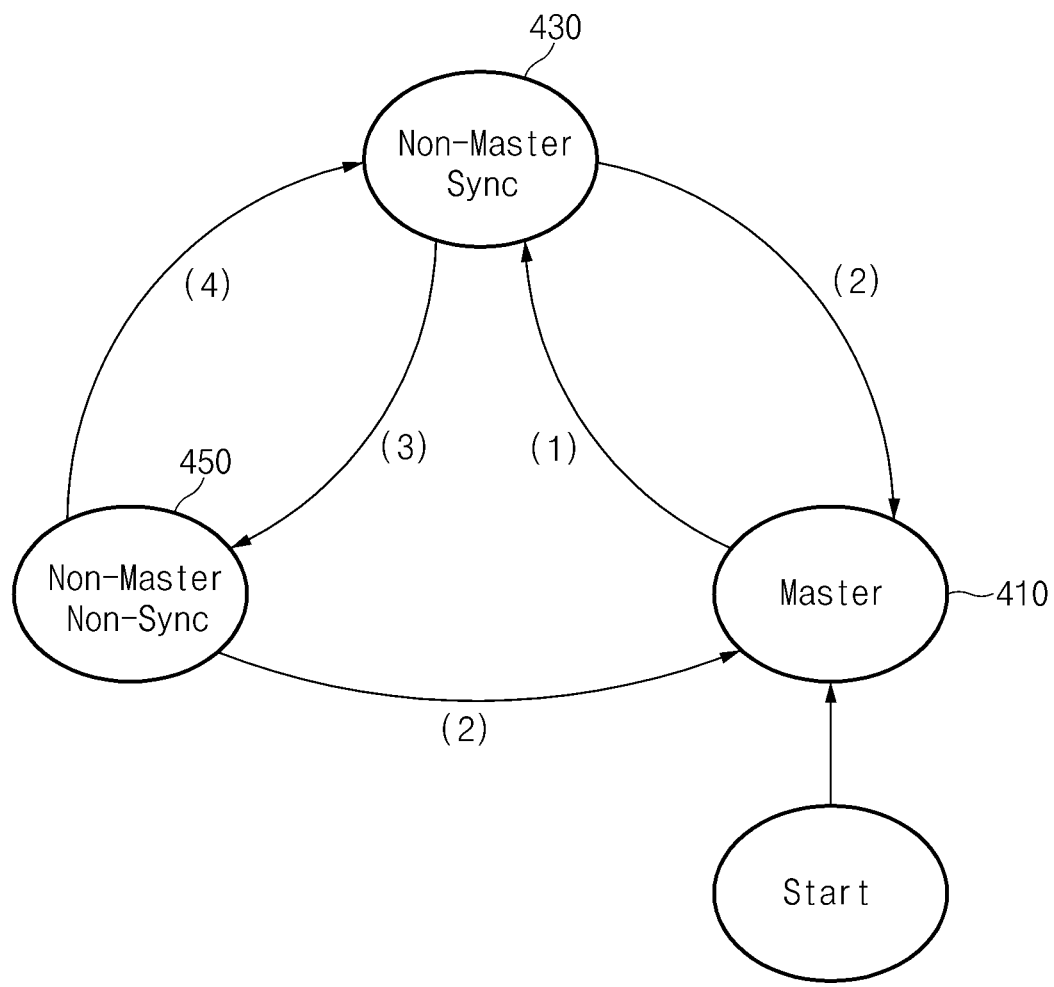
FIG. 4 is a diagram illustrating switching of a role and state of an electronic device within a cluster according to an embodiment.

FIG. 4 is a diagram illustrating switching of a role and state of an electronic device within a cluster according to an embodiment.

Referring to FIG. 4, electronic devices (e.g., 101, 102a, 102b, and/or 102c of FIG. 2) synchronized with a cluster (e.g., the cluster A of FIG. 2) may have any one role and/or state, such as being a master device 410, a non-master sync device 430, and a non-master non-sync device 450. Referring to Table 1 below, whether to allow the electronic devices 101, 102a, 102b, and/or 102c synchronized with a cluster (cluster A) to transmit a sync beacon (e.g., 320 of FIG. 3) and a discovery beacon (e.g., 350 of FIG. 3) may be determined according to the corresponding role and state. For example, the sync beacon may be transmittable by the master device 410 and the non-master sync device 430, and the discovery beacon may be transmittable by the master device 410.

TABLE 1

| Role and state | Sync beacon | Discovery beacon |
| --- | --- | --- |
| master device | transmittable | transmittable |
| non-master sync | transmittable | non-transmittable |
| non-master non-sync | non-transmittable | non-transmittable |

According to the NAN specification, the electronic devices 101, 102a, 102b, and/or 102c may have the role and state of the master device 410 when configuring or participating in a cluster (cluster A), and the role or state of the electronic devices 101, 102a, 102b, and/or 102c may be switched based on whether the following conditions according to the NAN specification are satisfied.

According to the NAN specification, if the following conditions are satisfied during the discovery window period, an electronic device having the role and state of the master device 410 may be switched (1) to the role and state of the non-master sync device 430.

A sync beacon having a received signal strength indication (RSSI) that is higher than RSSI_close (e.g., value larger than −60 dBm) is received from an electronic device within the same cluster, and the master rank of the electronic device that has transmitted the sync beacon is higher than the master rank of the master device 410.

A sync beacon having an RSSI that is higher than RSSI_middle (e.g., value larger than −75 dBm and less than RSSI_close) is received from at least three electronic devices within the same cluster, and the master ranks of the electronic devices that have transmitted the sync beacon are higher than the master rank of the master device 410.

According to the NAN specification, if the following conditions are satisfied during the discovery window period, an electronic device having the role and state of the non-master device 430 and/or 450 may be switched (2) to the role and state of the master device 410 when the discovery window period ends.

- A sync beacon having an RSSI that is higher than RSSI_close is not received from an electronic device within the same cluster, and the master rank of the electronic device that has transmitted the sync beacon is higher than the master rank of the master device 410.
- A sync beacon having an RSSI that is higher than RSSI_middle is received from less than three electronic devices within the same cluster, and the master ranks of the electronic devices that have transmitted the sync beacon are higher than the master rank of the master device 410.

According to the NAN specification, if at least one of the following conditions is satisfied during the discovery window period, an electronic device having the role and state of the non-master sync device 430 may be switched (3) to the role and state of the non-master non-sync device 450.

- A sync beacon having an RSSI that is higher than RSSI_close is received from an electronic device within the same cluster, an automated meter reading (AMR) value of the sync beacon is equal to an AMR value stored in the non-master sync device 430, a hop count field value of an electronic device that has transmitted the sync beacon is equal to or less than a hop count field value of the non-master sync device 430, and the master rank of the electronic device that has transmitted the sync beacon is higher than the master rank of the non-master sync device 430.
- A sync beacon having an RSSI that is higher than RSSI_middle is received from at least three electronic devices within the same cluster, an AMR value of the sync beacon is equal to an AMR value stored in the non-master sync device 430, hop count field values of electronic devices that have transmitted the sync beacon are equal to or less than the hop count field value of the non-master sync device 430, and the master ranks of the electronic devices that have transmitted the sync beacon are higher than the master rank of the non-master sync device 430.

According to the NAN specification, if the following conditions are all satisfied during the discovery window period, an electronic device having the role and state of the non-master non-sync device 450 may be switched (4) to the role and state of the non-master sync device 430 when the discovery window period ends.

- A sync beacon having an RSSI that is higher than RSSI_close is not received from an electronic device within the same cluster, an AMR value of the sync beacon is equal to an AMR value stored in the non-master non-sync device 450, a hop count field value of an electronic device that has transmitted the sync beacon is equal to or less than a hop count field value of the non-master non-sync device 450, and the master rank of the electronic device that has transmitted the sync beacon is higher than the master rank of the non-master non-sync device 450.
- A sync beacon having an RSSI that is higher than RSSI_middle is received from less than three electronic devices within the same cluster, an AMR value of the sync beacon is equal to an AMR value stored in the non-master non-sync device 450, hop count field values of electronic devices that have transmitted the sync beacon are equal to or less than the hop count field value of the non-master non-sync device 450, and the master ranks of the electronic devices that have transmitted the sync beacon are higher than the master rank of the non-master non-sync device 450.

Figure 5:
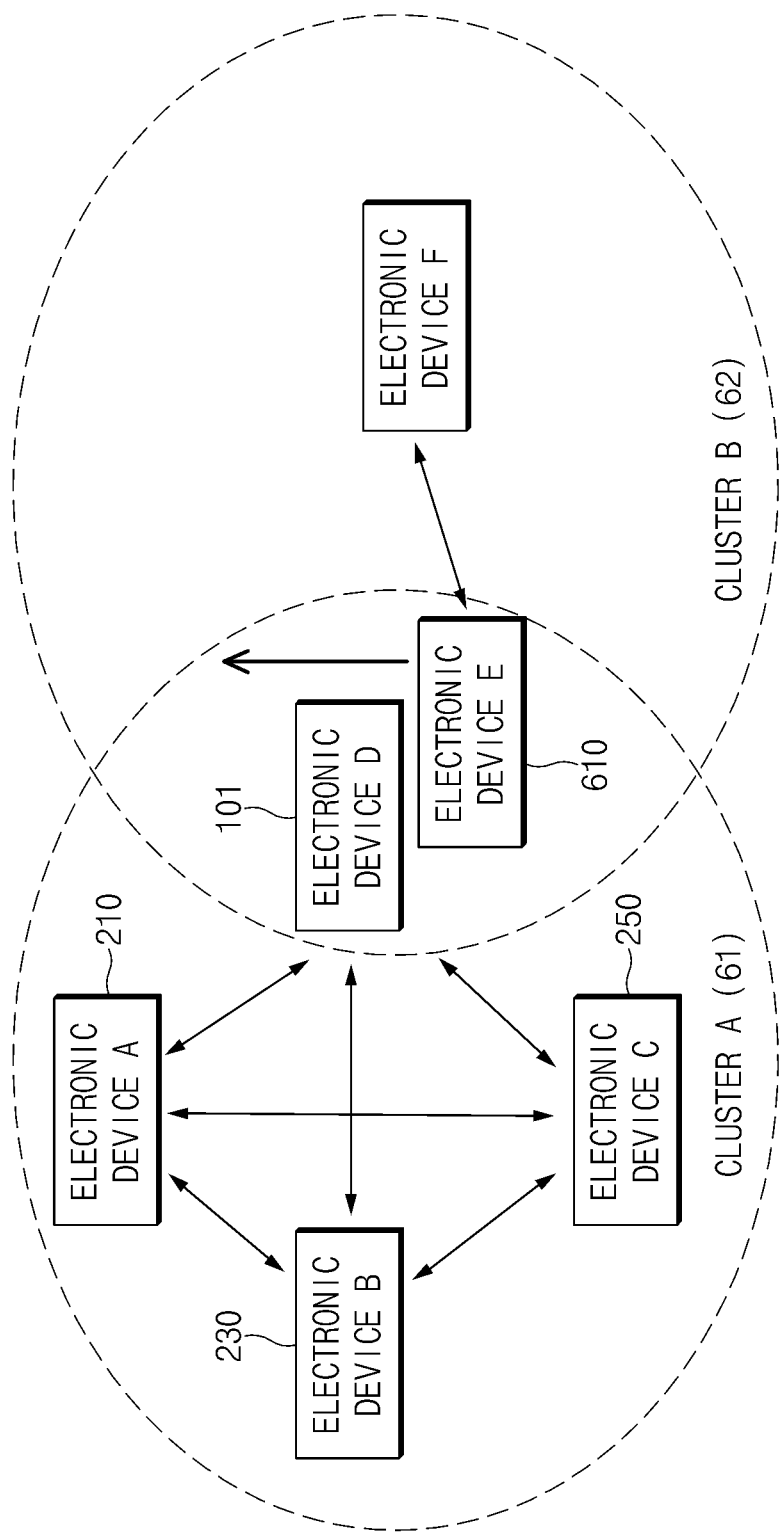
FIG. 5 is a diagram illustrating a merging form between a plurality of clusters according to an embodiment.

FIG. 5 is a diagram illustrating merging a plurality of clusters according to an embodiment.

Referring to FIG. 5, if an arbitrary electronic device synchronized with a first cluster (cluster A) or a second cluster (cluster B) moves, or a signal strength of the arbitrary electronic device changes, the range of the first cluster (cluster A) or the second cluster (cluster B) with which the electronic device is synchronized may be changed. According to an embodiment, due to the range change of the first cluster (cluster A) or the second cluster (cluster B), the first cluster (cluster A) and the second cluster (cluster B) may at least partially overlap each other, and an electronic device D (e.g., the electronic device 101 of FIG. 1) synchronized with the first cluster (cluster A) may determine whether to synchronize with the second cluster (cluster B) based on a grade relationship between the first cluster (cluster A) and the second cluster (cluster B).

In relation to the above description, the electronic device D 101 synchronized with the first cluster (cluster A) may receive, through a partial period on a time clock, proximity service data transmitted from the second cluster (cluster B) at least partially overlapping the first cluster (cluster A). For example, the electronic device D 101 may receive a discovery beacon transmitted from an arbitrary electronic device synchronized with the second cluster (cluster B) during a passive scan period corresponding to a portion of a period (e.g., the interval period 340 between the plurality of discovery window DW periods 310 of FIG. 3) other than a discovery window period (e.g., the discovery window DW period 310 of FIG. 3). In an embodiment, upon reception of a discovery beacon related to the second cluster (cluster B), the electronic device D 101 may determine that the second cluster (cluster B) at least partially overlaps or is adjacent to the first cluster (cluster A).

According to certain embodiments, the electronic device D 101 may also discover presence of the second cluster (cluster B) based on a beacon or probe response signal received from an access point or a Wi-Fi direct group owner, which is different from the discovery beacon received from an arbitrary electronic device synchronized with the second cluster (cluster B) described above. For example, the electronic device D 101 may discover the second cluster (cluster B) that at least partially overlaps or is adjacent to the first cluster (cluster A) based on cluster discovery attribute information included in the beacon or probe response signal received from the access point or Wi-Fi direct group owner.

In an embodiment, as presence of the second cluster (cluster B) is recognized, the electronic device D 101 synchronized with the first cluster (cluster A) may determine whether to synchronize with the second cluster (cluster B). For example, the electronic device D 101 may compare grade information of the first cluster (cluster A) with grade information of the second cluster (cluster B) included in the received discovery beacon, and may determine whether to synchronize with the second cluster (cluster B) based on the comparison. According to the NAN specification, the electronic device D 101 may maintain synchronization with the first cluster (cluster A) when the grade of the first cluster (cluster A) with which the electronic device D 101 is currently synchronized is relatively higher (or greater) than the grade of the second cluster (cluster B). Alternatively, when the grade of the first cluster (cluster A) with which the electronic device D 101 is currently synchronized is relatively lower (or smaller) than the grade of the second cluster (cluster B), the electronic device D 101 may be desynchronized with the first cluster (cluster A) and may be synchronized with the second cluster (cluster B). According to certain embodiments, the electronic device D 101 may also determine a cluster to synchronize with based on at least one of comparison between the numbers of electronic devices respectively synchronized with the first cluster (cluster A) and the second cluster (cluster B), comparison between the numbers of proximity services respectively provided by the first cluster (cluster A) and the second cluster (cluster B), and comparison between security levels of the first cluster (cluster A) and the second cluster (cluster B), in addition or as alternatives to the comparison between the grades of the first cluster (cluster A) and the second cluster (cluster B).

In an embodiment, the electronic device D 101 that has determined to synchronize with the second cluster (cluster B) may have the role and state of a master device or non-master sync device within the first cluster (cluster A). In this case, the electronic device D 101 may advertise the second cluster (cluster B) that is intends to synchronize with, before synchronizing with the second cluster (cluster B). For example, the electronic device D 101 may advertise the second cluster (cluster B) to at least one other electronic device (e.g., electronic device A 102*a*, electronic device B 102*b*, and/or electronic device C 102*c*) synchronized with the first cluster (cluster A) by transmitting a sync beacon including at least one piece of information about the second cluster (cluster B) during the discovery window period 310 of the first cluster (cluster A). In an embodiment, the at least one other electronic device 102*a*, 102*b*, and/or 102*c* synchronized with the first cluster (cluster A) may receive the sync beacon transmitted from the electronic device D 101 during the discovery window period 310 of the first cluster (cluster A), and may recognize presence of the second cluster (cluster B) based on the at least one piece of information about the second cluster (cluster B) included in the sync beacon.

Figure 6:
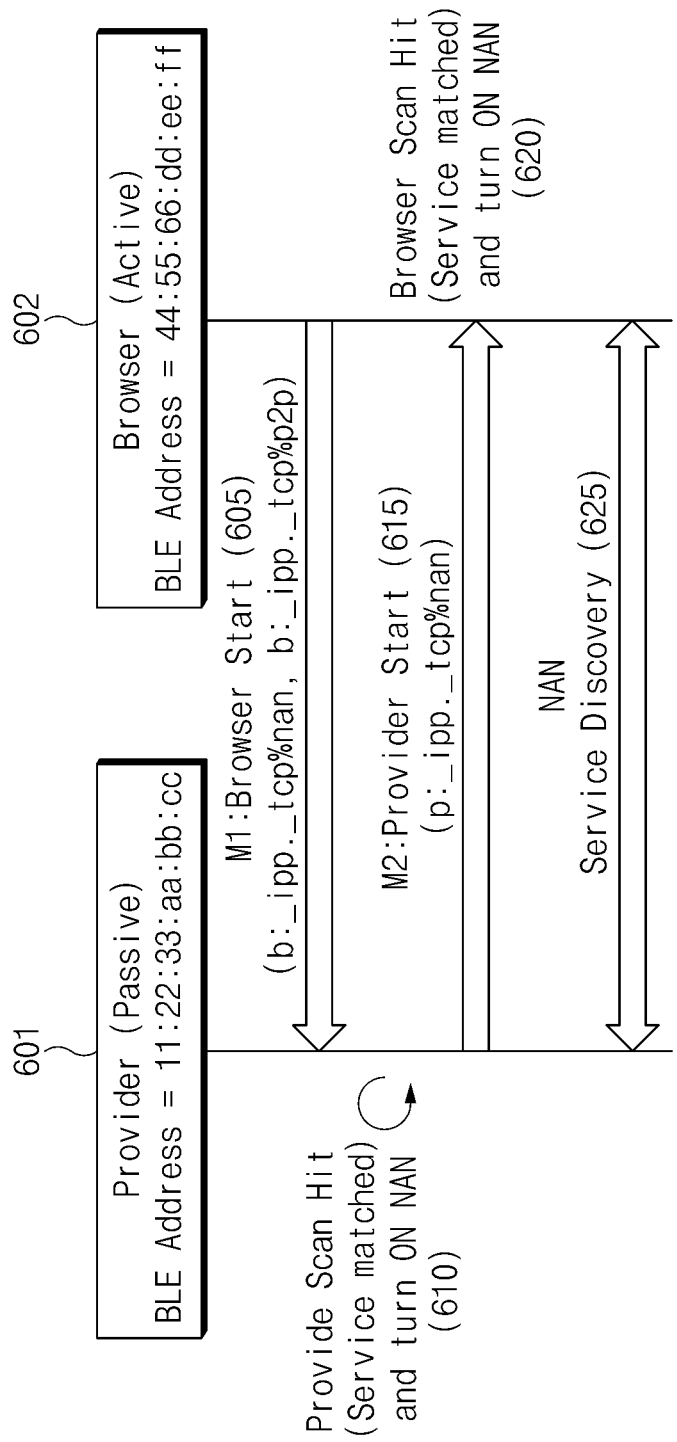
FIG. 6 is a diagram illustrating a NAN service discovery protocol using BLE communication according to an embodiment.

FIG. 6 is a diagram illustrating a NAN service discovery protocol using BLE communication according to an embodiment.

According to release 3 of the NAN specification, when operating low-power proximity communication (e.g., first communication) of the NAN specification, an NAN electronic device (e.g., the electronic device 101 of FIG. 1) may operate according to Bluetooth low energy (BLE) that triggers NAN communication protocol. For example, in order to reduce power consumed when performing periodic passive scan, the NAN electronic device 101 may discover another adjacent electronic device by performing BLE communication (e.g., second communication)-based scanning, and may determine to synchronize with a cluster with which the other electronic devices is synchronized using low-power proximity communication of the NAN specification.

A schematic flow of the BLE triggering NAN communication protocol will be described with reference to FIG. 6, and the electronic device 101 according to an embodiment may correspond to the provider electronic device 601 or browser (or seeker) electronic device 602 mentioned below.

Referring to FIG. 6, in operation 605, the browser electronic device 602 may transmit a BLE transport discovery service (TDS) packet using BLE communication. For example, in order to advertise first proximity service information provided by the browser electronic device 602, the browser electronic device 602 may transmit a BLE TDS packet in which the first proximity service information is included as, for example, a hash.

The provider electronic device 601 may receive the BLE TDS packet transmitted from the browser electronic device 602 through a scanning operation using BLE communication, and may identify the first proximity service information included in the BLE TDS packet. For example, in operation 610, the provider electronic device 601 may determine whether the first proximity service information included in the BLE TDS packet matches second proximity service information provided by the provider electronic device 601. When the first proximity service information and the second proximity service information match, the provider electronic device 601, in operation 615, may activate a low-power proximity communication function of the NAN specification, and may transmit a BLE TDS packet in which the second proximity service information is included as, for example, a hash using BLE communication.

Similarly to the above description, in operation 620, the browser electronic device 602 may receive the BLE TDS packet transmitted from the provider electronic device 601 by performing a scanning operation using BLE communication, and may determine whether the second proximity service information included in the BLE TDS packet matches the first proximity service information provided by the browser electronic device 602. When the second proximity service information and the first proximity service information match, the browser electronic device 602 may activate a low-power proximity communication function of the NAN specification.

In operation 625, the browser electronic device 602 and the provider electronic device 601 may perform service discovery of the NAN specification.

As the low-power proximity communication functions of the provider electronic device 601 and the browser electronic device 602 are activated, a merging process between a cluster with which the provider electronic device 601 is synchronized and a cluster with which the browser electronic device 602 is synchronized may be performed. For example, the browser electronic device 602 may be synchronized with the cluster with which the provider electronic device 601 is synchronized, or the provider electronic device 601 may be synchronized with the cluster with which the browser electronic device 602 is synchronized.

Figure 7:
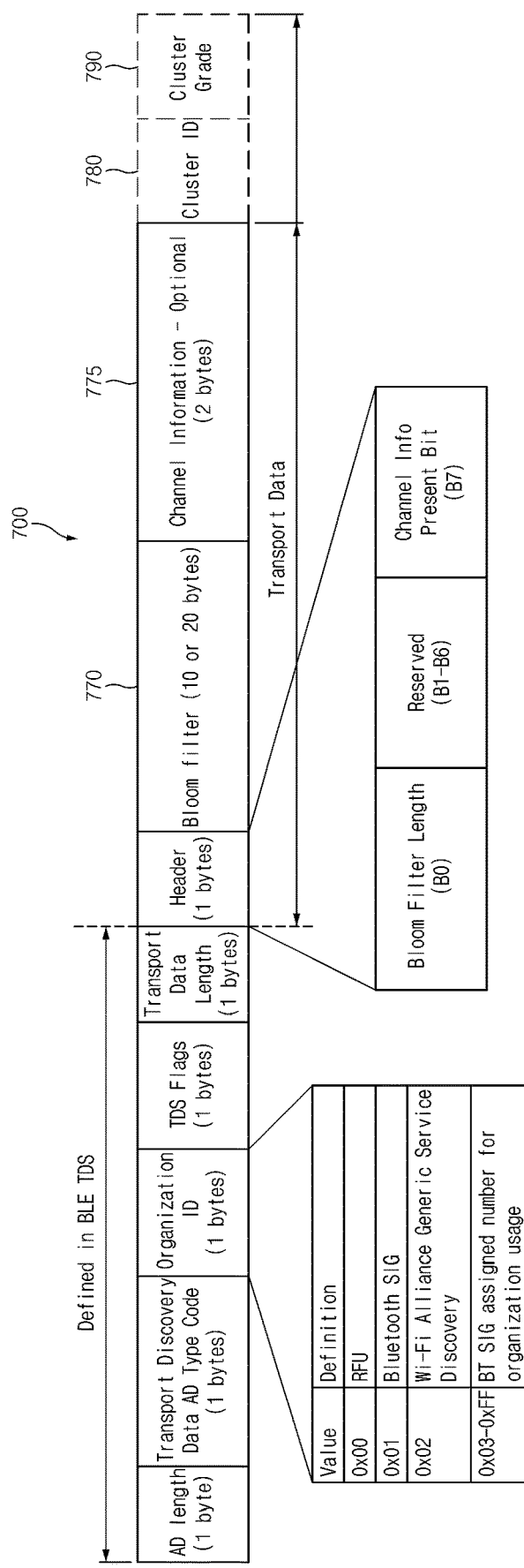
FIG. 7 is a diagram illustrating a BLE TDS packet according to an embodiment.

FIG. 7 is a diagram illustrating a BLE TDS packet 700 according to an embodiment.

Referring to FIG. 7, an electronic device (e.g., the electronic device 101 of FIG. 1), when operating low-power proximity communication (e.g., first communication) of the NAN specification, may transmit the BLE TDS packet 700 in which first proximity service information provided by the electronic device 101 is included using BLE communication (e.g., second communication) according to BLE triggering NAN communication protocol defined in release 3 of the NAN specification. For example, the electronic device 101 may add, to a bloom filter 770, a value generated by hashing the first proximity service information using a bloom filter. Alternatively, the electronic device 101 may receive, from another electronic device (e.g., first external electronic device), the BLE TDS packet 700 in which second proximity service information provided by the other electronic device is included by performing a scanning operation using the BLE communication. For example, the electronic device 101 may obtain the second proximity service information based on a value of the bloom filter 770 of the received BLE TDS packet 700.

In an embodiment, the electronic device 101 may determine whether the second proximity service information in the BLE TDS packet 700 received from the other electronic device matches the first proximity service information, and may control activation of a low-power proximity communication function of the NAN specification based on the determination result. For example, when it is determined that the second proximity service information and the first proximity service information match, the electronic device may activate a low-power proximity communication function of the NAN specification. In an embodiment, the electronic device 101 may obtain grade information of a cluster with which the other electronic device is synchronized using the activated low-power proximity communication of the NAN specification, and may determine whether to synchronize with the cluster based on comparison between the grade information of a cluster (e.g., the cluster A of FIG. 5) with which the electronic device 101 is synchronized and the grade information of the cluster with which the other electronic device is synchronized.

According to an embodiment, the electronic device 101 synchronized with an arbitrary cluster may reduce power consumption of the electronic device 101 by controlling at least a portion of the low-power proximity communication function of the NAN specification to enter a deactivated state. For example, the electronic device 101 may deactivate a passive scan function, where the passive scan function is performed during a portion of an interval period between a plurality of discovery window periods of the synchronized arbitrary cluster. Alternatively, the electronic device 101 may refrain from deactivating the passive scan function, and may instead adjust the interval of execution of the passive scan function to be longer, thereby reducing power consumption.

In an embodiment, the electronic device 101 synchronized with the arbitrary cluster may transmit the BLE TDS packet 700 including at least one of proximity service information provided by the electronic device 101 and identification information (e.g., cluster ID) and grade information about the arbitrary cluster with which the electronic device 101 is synchronized using BLE communication. For example, the BLE TDS packet 700 may include a cluster ID 780 and/or a cluster grade 790. The cluster ID 780 and/or the cluster grade 790 may follow the bloom filter 770 (e.g., when channel information 775 is omitted) or channel information 775. The cluster ID 780 may include identification information about a cluster. The cluster grade 790 may include information about the grade of a cluster. Furthermore, the electronic device 101 synchronized with the arbitrary cluster may receive, from another electronic device (e.g., the first external electronic device or the second external electronic device), the BLE TDS packet 700 including at least one of proximity service information provided by the other electronic device and identification information and grade information about a cluster with which the other electronic device is synchronized through a scanning operation using BLE communication.

According to an embodiment, the electronic device 101 may determine whether at least one of the identification information and grade information about the arbitrary cluster with which the electronic device 101 is synchronized matches at least one of the identification information (e.g., the cluster ID 780) and grade information (e.g., the cluster grade 790) in the BLE TDS packet 700 received from the other electronic device (e.g., the first external electronic device or the second external electronic device). Based on the result of the determination, the electronic device 101 may determine to reactivate the passive scan function or readjust the interval of the passive scan function to a previous interval.

With regard to FIG. 7, although it has been described that the BLE TDS packet 700 includes identification information (e.g., cluster ID) and grade information (e.g., cluster grade), embodiments of the present disclosure are not limited thereto. A packet having an arbitrary format other than the BLE TDS packet 700 may be used for transferring identification information and/or grade information. For example, a packet based on a Bluetooth standard specification may be used for transferring identification information and/or grade information. In another example, a packet having an arbitrary format which is not based on the Bluetooth standard specification may be used for transferring identification information and/or grade information. In yet another example, a packet having a format defined by another communication standard specification may be used for transferring identification information and/or grade information.

Hereinafter, certain embodiments related to control of the passive scan function will be described with reference to FIGS. 8, 9, 10, and 11.

Figure 8:
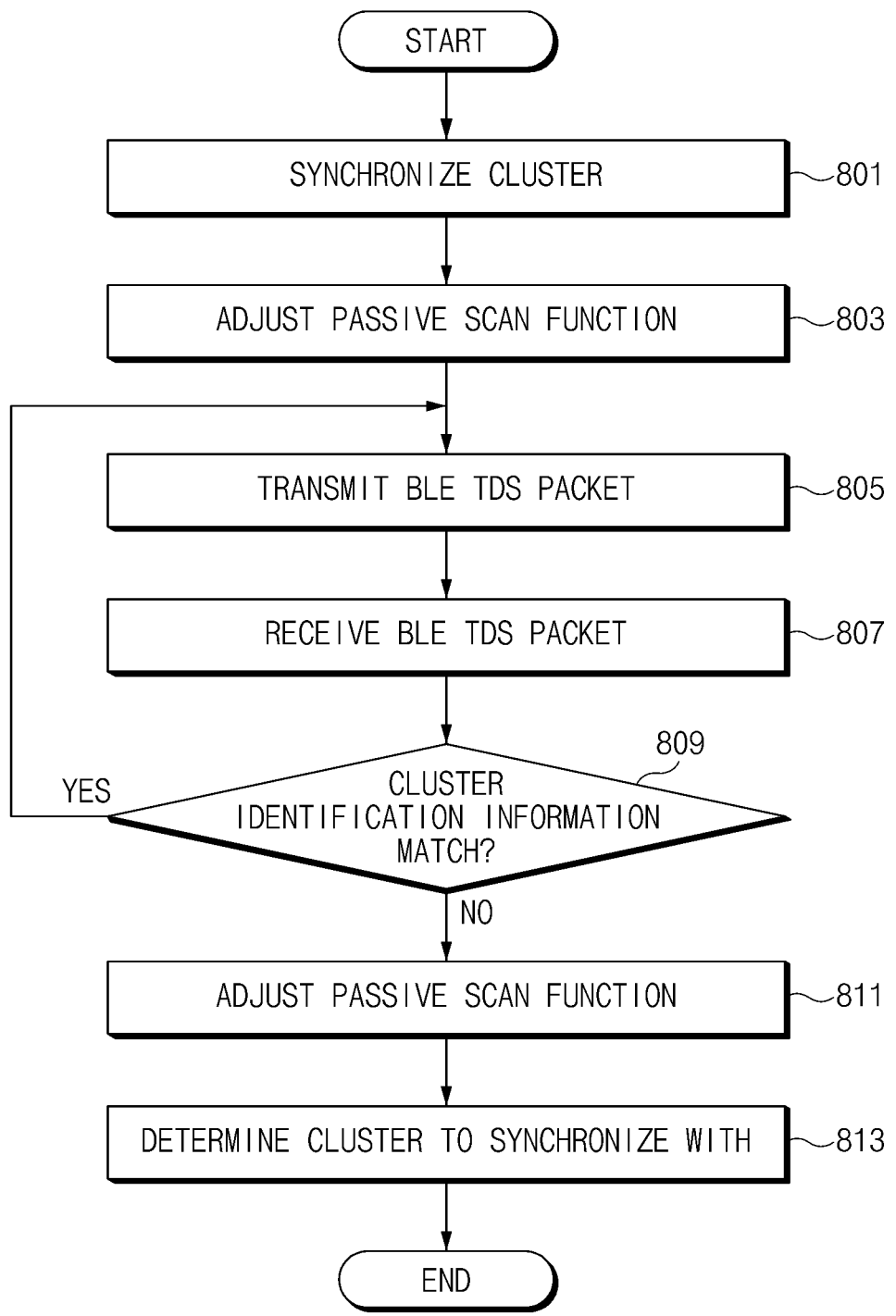
FIG. 8 is a flowchart illustrating an NAN-based cluster merging method of an electronic device according to an embodiment.

FIG. 8 is a flowchart illustrating an NAN-based cluster merging method of an electronic device according to an embodiment.

Referring to FIG. 8, in operation 801, an electronic device (e.g., the electronic device 101 of FIG. 1) may be synchronized with an arbitrary cluster. In relation to this operation, a processor (e.g., the processor 120 of FIG. 1) of the electronic device 101 may receive a BLE TDS packet by controlling a wireless communication circuit (or wireless communication module) (e.g., the wireless communication module 192 of FIG. 1) according to BLE triggering NAN communication protocol defined in release 3 of the NAN specification. For example, the processor 120 may receive, from another electronic device (e.g., first external electronic device), a BLE TDS packet including proximity service information. The BLE TDS packet may be received by performing a scanning operation using BLE communication (e.g., second communication). The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, the processor 120 may compare first proximity service information provided by the electronic device 101 with second proximity service information in the BLE TDS packet received from the other electronic device to determine whether the information matches. When the first proximity service information and the second proximity service information match, the processor 120 may control activation of a low-power proximity communication (e.g., first communication) function of the NAN specification. For example, if the first proximity service information and the second proximity service information match, the processor 120 may activate the low-power proximity communication (e.g., first communication) function of the NAN specification. If the first proximity service information and the second proximity service information do not match, the processor 120 may not activate the low-power proximity communication (e.g., first communication) function of the NAN specification.

After activating the low-power proximity communication (e.g., first communication) function of the NAN specification, the processor 120, in operation 803, may adjust (e.g., first adjustment) a state or interval of at least a portion, for example, the passive scan function, of the low-power proximity communication (e.g., first communication) function of the NAN specification. For example, the processor 120 may deactivate the passive scan function or adjust an execution interval of the passive scan function to a first interval, the passive scan function being performed through a portion of an interval period between a plurality of discovery window periods of the arbitrary cluster with which the electronic device 101 is synchronized. For example, after the synchronization according to operation 810, the processor 120 may reduce power consumption of the electronic device 101 by not performing periodic NAN passive scan or by reducing the frequency of the NAN passive scan.

In operation 805, the processor 120 may transmit a BLE TDS packet using BLE communication. For example, the processor 120 may transmit, at a specified interval, a BLE TDS packet including proximity service information provided by the electronic device 101 and first identification information (e.g., cluster ID) of the arbitrary cluster with which the electronic device 101 is synchronized. For example, the first identification information may be included in the cluster ID 780.

In operation 807, the processor 120 may receive, from another electronic device (e.g., first external electronic device or second external electronic device), a BLE TDS packet by performing a scanning operation using BLE communication. For example, the processor 120 may receive a BLE TDS packet including proximity service information provided by the other electronic device and second identification information (e.g., cluster ID) of a cluster with which the other electronic device is synchronized. The BLE TDS packet may be received by performing a scanning operation using BLE communication at an interval that is different from the BLE TDS packet transmission interval of the electronic device 101. For example, the second identification information may be included in the cluster ID 780.

Although FIG. 8 illustrates that operation 805 is performed before operation 807, embodiments of the present disclosure are not limited thereto. For example, operation 805 and operation 807 may be performed substantially at the same time. For another example, operation 807 may be performed before operation 805.

In operation 809, the processor 120 may determine whether the first identification information of the arbitrary cluster with which the electronic device 101 is synchronized matches (or corresponds to) the second identification information of the cluster with which the other electronic device is synchronized. In an embodiment, when the first identification information and the second identification information match, the processor 120 may determine that the cluster with which the other electronic device is synchronized and the arbitrary cluster with which the electronic device 101 is synchronized are the same, and may reperform the operation of transmitting a BLE TDS packet including the first identification information.

According to an embodiment, when it is determined that the first identification information and the second identification information do not match, the processor 120, in operation 811, may adjust (e.g., second adjustment) a state or interval of the passive scan function. For example, the processor 120 may determine that the cluster with which the other electronic device is synchronized and the arbitrary cluster with which the electronic device 101 is synchronized are different from each other. In this case, the passive scan function adjusted to be activated or the first interval adjusted in operation 803 may be adjusted to a second interval that is shorter than the first interval.

In operation 813, the processor 120 may determine a cluster to synchronize with. For example, the processor 120 may receive, from the other electronic device, a discovery beacon or sync beacon including grade information about the cluster with which the other electronic device is synchronized by performing the activated passive scan or based on the second interval based on low-power proximity communication (e.g., first communication) of the NAN specification, and may compare a grade of the arbitrary cluster with which the electronic device 101 is synchronized with a grade of the cluster with which the other electronic device is synchronized.

In an embodiment, when the grade of the arbitrary cluster with which the electronic device 101 is synchronized is higher (or greater) than the grade of the cluster with which the other electronic device is synchronized, the processor 120 may control to maintain synchronization of the electronic device 101 with the arbitrary cluster. Alternatively, when the grade of the arbitrary cluster with which the electronic device 101 is synchronized is lower (or smaller) than the grade of the cluster with which the other electronic device is synchronized, the processor 120 may control to synchronize the electronic device 101 with the cluster with which the other electronic device is synchronized. According to an embodiment, when the electronic device 101 is synchronized with a second cluster with which the other electronic device is synchronized, the processor 120 may update cluster identification information included in a BLE TDS packet to be transmitted to identification information of the synchronized second cluster.

Figure 9:
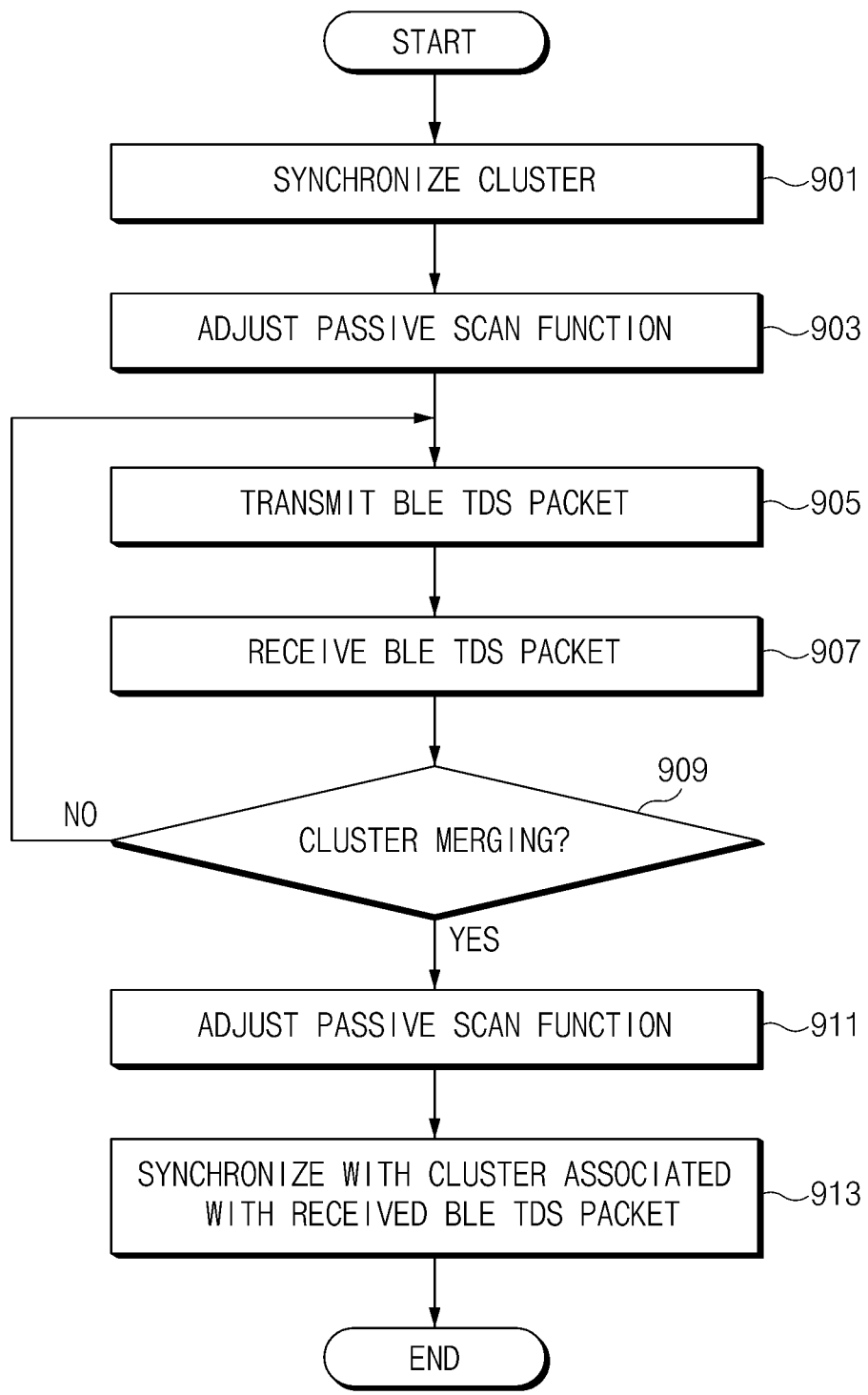
FIG. 9 is a flowchart illustrating an NAN-based cluster merging method of an electronic device according to another embodiment.

FIG. 9 is a flowchart illustrating an NAN-based cluster merging method of an electronic device according to another embodiment.

Referring to FIG. 9, in operation 901, an electronic device (e.g., the electronic device 101 of FIG. 1) may be synchronized with an arbitrary cluster, and, in operation 903, a processor (e.g., the processor 120 of FIG. 1) may adjust (e.g., first adjustment) at least a portion, for example, the passive scan function, of a low-power proximity communication function of the NAN specification. For example, the passive scan function may be deactivated or a first interval of the passive scan function may be adjusted. Operation 901 and operation 903 may be respectively the same as or similar to operation 801 and operation 803 described above with reference to FIG. 8, and duplicative descriptions may be omitted below.

In operation 905, the processor 120 may transmit a BLE TDS packet using BLE communication. For example, the processor 120 may transmit, at a specified interval, a BLE TDS packet including proximity service information provided by the electronic device 101 and identification information (e.g., cluster ID) and grade information of an arbitrary cluster with which the electronic device 101 is synchronized.

In operation 907, the processor 120 may receive a BLE TDS packet from another electronic device by performing a scanning operation using BLE communication. For example, the processor 120 may receive a BLE TDS packet including proximity service information provided by the other electronic device and identification information (e.g., cluster ID) and grade information of a cluster with which the other electronic device is synchronized. The BLE TDS packet may be received by performing a scanning operation using BLE communication at an interval that is different from a BLE TDS packet transmission interval of the electronic device 101. For example, the second identification information may be included in the cluster ID 780.

Although FIG. 9 illustrates that operation 905 is performed before operation 907, embodiments of the present disclosure are not limited thereto. For example, operation 905 and operation 907 may be performed substantially at the same time. For another example, operation 907 may be performed before operation 905.

In operation 909, the processor 120 may determine whether to merge a cluster. For example, the processor 120 may determine whether to merge a cluster based on the second identification information and second grade information, which are included in the received BLE TDS packet, of the cluster with which the other electronic device is synchronized. For example, when first identification information of the cluster with which the electronic device 101 is synchronized does not match the second identification information, the processor 120 may determine not to perform cluster merging. In another example, when the first identification information and the second identification information match, the processor 120 may determine whether to merge the clusters based on the second grade information and first grade information of the cluster with which the electronic device is synchronized. When the grade of the second grade information is greater than a grade of the first grade information, the processor 120 may determine to perform cluster merging. When the grade of the second grade information is equal to or smaller than the grade of the first grade information, the processor 120 may determine not to perform cluster merging.

When it is determined not to perform cluster merging, the processor 120 may reperform an operation of transmitting a BLE TDS packet including the first identification information and the first grade information.

When it is determined to perform cluster merging, the processor 120, in operation 911, may adjust (e.g., second adjustment) the state or interval of the passive scan function. For example, the processor 120 may determine that the cluster with which the other electronic device is synchronized and the arbitrary cluster with which the electronic device 101 is synchronized are different from each other, and the passive scan function adjusted to be activated or the interval of the passive scan function adjusted to the first interval in operation 903 may be adjusted to a second interval that is shorter than the first interval.

In operation 913, the processor 120 may perform synchronization with a cluster (e.g., cluster with which another electronic device is synchronized) associated with the received BLE TDS packet. According to an embodiment, when the electronic device 101 is synchronized with the cluster with which the other electronic device is synchronized, the processor 120 may update identification information and grade information of a previous cluster included in a BLE TDS packet to be transmitted to identification information and grade information of the synchronized cluster.

Figure 10:
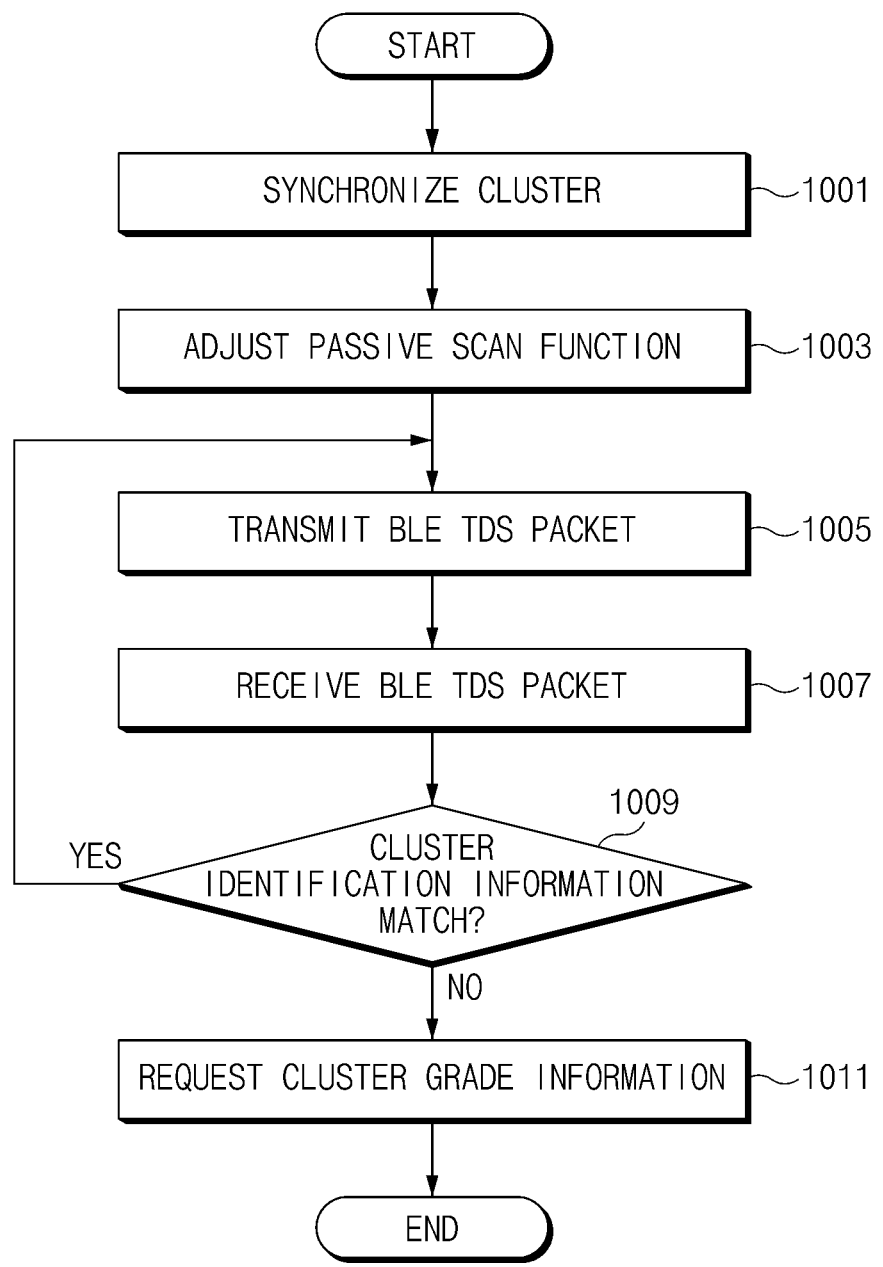
FIG. 10 is a flowchart illustrating an NAN-based cluster merging method of an electronic device according to another embodiment.

FIG. 10 is a flowchart illustrating an NAN-based cluster merging method of an electronic device according to another embodiment.

Referring to FIG. 10, in operation 1001, an electronic device (e.g., the electronic device 101 of FIG. 1) may be synchronized with an arbitrary cluster, and, in operation 1003, a processor (e.g., the processor 120 of FIG. 1) may adjust (e.g., first adjustment) at least a portion, for example, the passive scan function, of a low-power proximity communication function of the NAN specification to be deactivated or adjust a first interval of the passive scan function. Operation 1001 and operation 1003 may be respectively the same as or similar to operation 801 and operation 803 described above with reference to FIG. 8, and duplicative descriptions may be omitted below.

In operation 1005, the processor 120 may transmit a BLE TDS packet using BLE communication. For example, the processor 120 may transmit, at a specified interval, a BLE TDS packet including at least one of proximity service information provided by the electronic device 101 and identification information (e.g., cluster ID) and grade information of the arbitrary cluster with which the electronic device 101 is synchronized.

In operation 1007, the processor 120 may receive a BLE TDS packet from another electronic device by performing a scanning operation using BLE communication. For example, the processor 120 may receive a BLE TDS packet including proximity service information provided by the other electronic device and identification information (e.g., cluster ID) of a cluster with which the other electronic device is synchronized. The BLE TDS packet may be received by performing a scanning operation using BLE communication at an interval that is different from a BLE TDS packet transmission interval of the electronic device 101.

In operation 1009, the processor 120 may determine whether first identification information of the arbitrary cluster with which the electronic device 101 is synchronized matches second identification information of the cluster with which the other electronic device is synchronized. In an embodiment, when it is determined that the first identification information and the second identification information match (e.g., when the first identification information corresponds to the second identification information), the processor 120 may determine that the cluster with which the other electronic device is synchronized and the arbitrary cluster with which the electronic device 101 is synchronized are the same, and may reperform the operation of transmitting a BLE TDS packet including at least one of the first identification information and grade information of the arbitrary cluster with which the electronic device 101 is synchronized.

According to an embodiment, when it is determined that the first identification information and the second identification information do not match (e.g., when the first identification information is different from the second identification information), the processor 120, in operation 1011, may request the other electronic device to send a BLE TDS packet including grade information of the cluster with which the other electronic device is synchronized using BLE communication.

In an embodiment, as the first identification information and the second identification information do not match, the cluster with which the other electronic device is synchronized and the arbitrary cluster with which the electronic device 101 is synchronized may be different from each other, and, in this case, first grade information of the arbitrary cluster with which the electronic device 101 is synchronized and second grade information in the BLE TDS packet received from the other electronic device may also be different from each other. The processor 120 may determine a cluster having relatively higher (or greater) grade information by comparing the first grade information and the second grade information, and may determine a cluster to synchronize with based on the determination.

In an embodiment, when the first grade information is relatively higher (or greater) than the second grade information according to the determination, the processor 120 may control to maintain synchronization with the arbitrary cluster with which the electronic device 101 is synchronized, and may maintain the adjusted (e.g., first adjustment) state or interval of the passive scan function. Alternatively, when the first grade information is relatively lower (or smaller) than the second grade information according to the determination, the processor 120 may adjust (e.g., second adjustment) the passive scan function previously adjusted to be deactivated to an active state or adjust the previously-adjusted first interval to a second interval that is shorter than the first interval, and may control to synchronize the electronic device 101 with the cluster with which the other electronic device is synchronized.

Figure 11:
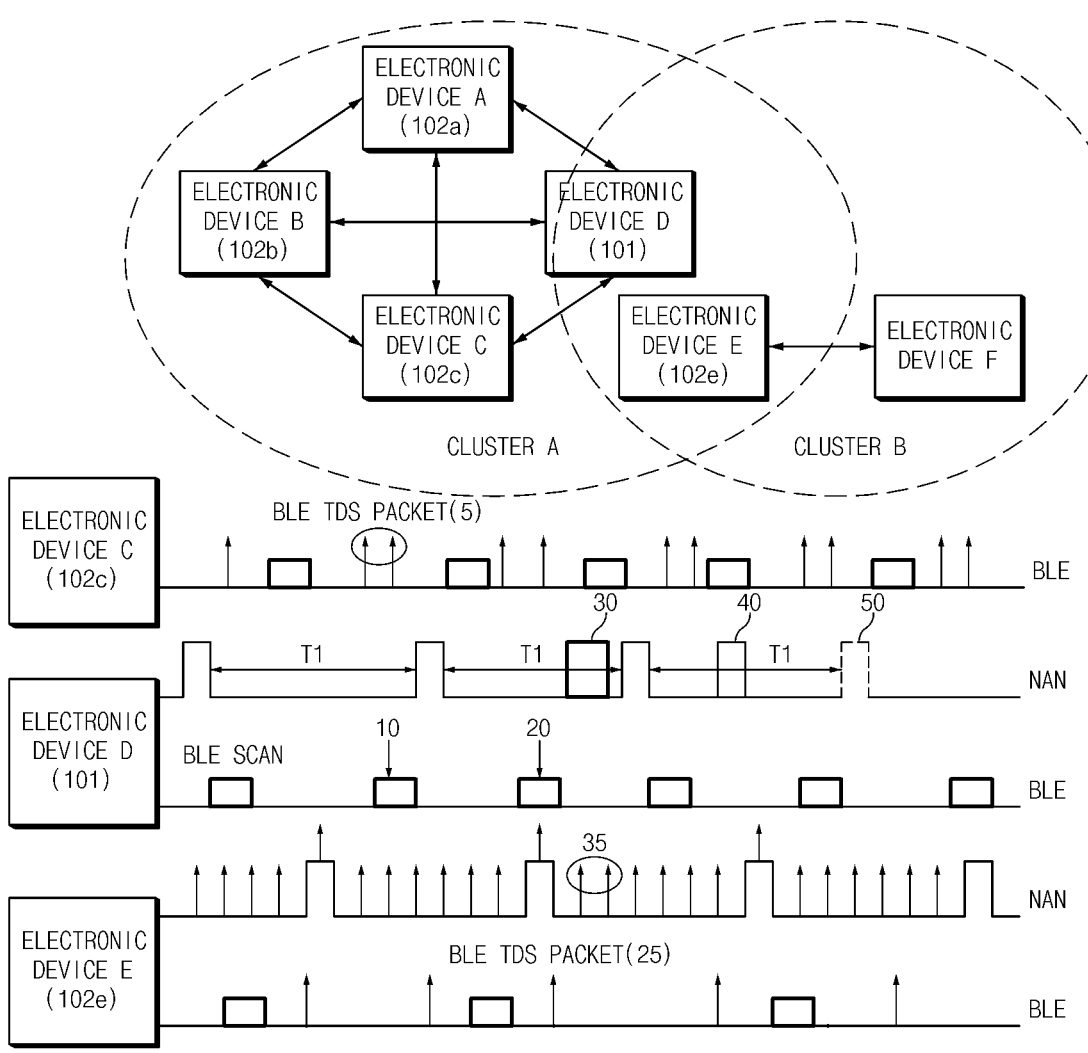
FIG. 11 is a diagram illustrating a time clock related to NAN-based cluster merging of an electronic device according to an embodiment.

FIG. 11 is a diagram illustrating a time clock related to NAN-based cluster merging of an electronic device according to an embodiment.

Referring to FIG. 11, an electronic device D 101 (e.g., the electronic device 101 of FIG. 1) according to an embodiment may adjust (e.g., first adjustment) a state or interval of a passive scan function included in a low-power proximity communication function of the NAN specification after being synchronized with an arbitrary cluster (cluster A) according to BLE triggering NAN communication protocol defined in release 3 of the NAN specification. For example, the electronic device D 101 may control the passive scan function to be deactivated or adjust an execution interval of the passive scan function to a first interval T1.

In an embodiment, the electronic device D 101 may receive a BLE TDS packet 5 transmitted from another electronic device C 102c by performing a scanning operation using BLE communication in a scanning window 10. For example, the electronic device D 101 may receive the BLE TDS packet 5 including identification information (e.g., cluster ID) of a cluster (cluster A) with which the other electronic device C 102c is synchronized and/or grade information of the cluster (cluster A). In response to reception of the BLE TDS packet 5, the electronic device D 101 may compare first identification information and first grade information of the cluster (cluster A) with which the electronic device D 101 is synchronized and second identification information and second grade information, which are in the BLE TDS packet, of the cluster (cluster A) with which the other electronic device C 102c is synchronized. In an embodiment, when the first identification information and the second identification information correspond to each other (e.g., when the first identification information and the second identification information are the same), the electronic device D 101 may determine that the electronic device D 101 is synchronized with the same cluster (cluster A) as the other electronic device C 102c. When the first identification information and the second identification information correspond to each other, and the first grade information and the second grade information correspond to each other (e.g., the first grade information and the second grade information are the same), the electronic device D 101 may determine that the electronic device D 101 is synchronized with the same cluster (cluster A) as the other electronic device C 102c. When it is determined that the electronic device D 101 and the other electronic device C 102c are synchronized with the same cluster (cluster A), the electronic device 101 may maintain the adjusted state or interval of the passive scan function.

In an embodiment, the electronic device D 101 may receive a BLE TDS packet 25 transmitted from another electronic device E 102e by performing a scanning operation using BLE communication in a scanning window 20. For example, the electronic device D 101 may receive a BLE TDS packet including identification information (e.g., cluster ID) of a cluster (cluster B) with which the other electronic device E 102e is synchronized and grade information of the cluster (cluster B). In an embodiment, the electronic device D 101 may determine that the first identification information and/or first grade information of the cluster with which the electronic device D 101 is synchronized is different from third identification information and/or third grade information in the BLE TDS packet 25 received from the other electronic device E 102e, and, in this case, the electronic device D 101 may adjust (second adjustment) the adjusted state or interval of the passive scan function. For example, the electronic device D 101 may adjust the passive scan function previously adjusted to be deactivated to an active state or adjust the first interval T1 to a second interval that is shorter than the first interval T1. For example, the electronic device D 101 may perform passive scan in an adjusted scanning window 30 prior to a scanning window scheduled by the first interval T1.

In an embodiment, the electronic device D 101 may receive a beacon signal or sync signal (e.g., signal 35) from the electronic device E 102e using NAN communication in the adjusted scanning window 30.

In an embodiment, when the first grade information of the cluster A with which the electronic device D 101 is synchronized is relatively lower (or smaller) than the third grade information of the cluster B included in the beacon signal or sync signal from the electronic device E 102e, the electronic device D 101 may be synchronized with a discovery window period 40 of the cluster (cluster B) with which the other electronic device E 102e is synchronized, and may release a discovery window period 50 of the cluster (cluster A) with which the electronic device D 101 was previously synchronized.

For example, electronic devices of the cluster A or cluster B may form a cluster according to various methods. Electronic devices may transmit/receive data to/from each other within a cluster. For example, an electronic device may transmit files or music files or may stream multimedia files to another electronic device within a cluster. Electronic devices of the cluster A and/or cluster B may generate a cluster or may be synchronized with a cluster based on Wi-Fi aware.

For example, the electronic device D 101 may transmit/receive a file to/from the electronic device A 102a, and the electronic device E 102e may share (e.g., transmit/receive) a file with an electronic device F. For example, the cluster A may be a cluster generated in a living room of a house, and the cluster B may be a cluster generated in a kitchen of a house. The electronic device D 101 may synchronize the cluster A and the cluster B through cluster merging. After synchronizing the clusters, the electronic device D 101 may discover the electronic device E 102e and the electronic device F. The electronic device D 101 may additionally share a file with the electronic device E 102e and the electronic device F. Similarly, since clusters generated locally are synchronized in a house, a file sharing range may be expanded.

For example, the cluster A and/or the cluster B may be a Wi-Fi aware-based network configured in a house, office, store, or public place. A user may generate a cluster with another electronic device based on Wi-Fi aware outside a house or office using a mobile electronic device (e.g., IoT device). When the user having the mobile electronic device moves into the house or office, the mobile electronic device may merge a cluster outside the house or office and a cluster inside the house or office through cluster merging.

An electronic device (e.g., the electronic device 101 of FIG. 1) may include at least one wireless communication circuit (e.g., the communication module 190 of FIG. 1) configured to perform first communication and second communication of a protocol different from that of the first communication, and a processor (e.g., the processor 120 of FIG. 1) operatively connected to the at least one wireless communication circuit.

The processor may synchronize with a first cluster having first information based on the first communication using the at least one wireless communication circuit. For example, the processor may synchronize with the first cluster based on a Bluetooth low energy (BLE) triggers neighbor awareness networking (NAN) communication protocol of an NAN specification.

The processor may perform first adjustment on at least a portion of a function related to discovery of the first communication. For example, the first adjustment may include adjusting a passive scan function to a deactivated state, the passive scan function being performed through a portion of an interval period between a plurality of discovery window periods of the first cluster.

The processor may receive a first signal transmitted from at least one external electronic device based on the second communication using the at least one wireless communication circuit, and may obtain, from the first signal, second information of a second cluster associated with the at least one external electronic device. For example, the first signal may include a BLE TDS packet including the second information. The second information may include identification information of the second cluster.

The processor may be configured to determine second adjustment on at least the portion of the function related to discovery of the first communication based on whether the first information of the first cluster and the second information correspond to each other. For example, the processor may be configured to perform the second adjustment if the second information does not correspond to the first information. For example, the processor may be configured to receive grade information of the second cluster based on the first communication by performing passive scan according to the second adjustment, and determine whether to synchronize with the second cluster based on the grade information of the second cluster and grade information of the first cluster. For example, the processor may be configured to synchronize with the second cluster if a grade of the grade information of the first cluster is relatively lower or smaller than a grade of the grade information of the second cluster.

The processor may be configured to perform the second adjustment by activating passive scan in at least a portion of an interval period between a plurality of discovery window periods of the first cluster based on the first communication. For example, a first interval of the passive scan according to the first adjustment may be longer than a second interval of the passive scan according to the second adjustment.

The processor may transmit a second signal including the first information related to the first cluster based on the second communication using the at least one wireless communication circuit. For example, the second signal may include a Bluetooth low energy transport discovery service (BLE TDS) packet, wherein the BLE TDS packet may include the first information. For example, the first information may include identification information of the first cluster.

The processor may be configured to transmit a signal including information related to the second cluster based on the second communication using the at least one wireless communication circuit, after synchronizing with the second cluster.

An NAN-based cluster merging method of an electronic device according to an embodiment may include: synchronizing with a first cluster based on first communication; performing first adjustment on at least a portion of a function related to execution of the first communication; transmitting a first signal including first information related to the first cluster based on second communication of a specification different from that of the first communication; receiving a second signal transmitted from at least one external electronic device based on the second communication; and determining second adjustment on at least the portion of the function related to execution of the first communication based on whether the first information of the first signal and second information of the second signal correspond to each other.

For example, the synchronizing with the first cluster based on the first communication may include synchronizing with the first cluster based on a Bluetooth low energy (BLE) triggers neighbor awareness networking (NAN) communication protocol of an NAN specification.

For example, the performing the first adjustment on at least a portion of the function related to execution of the first communication may include adjusting a passive scan function to be deactivated, the passive scan function being performed during a portion of an interval period between a plurality of discovery window periods of the first cluster.

For example, the transmitting the first signal including the first information related to the first cluster based on the second communication may include at least one of transmitting a BLE transport discovery service (TDS) packet including identification information of the first cluster based on BLE communication and transmitting a BLE TDS packet including grade information of the first cluster based on the BLE communication.

For example, the second signal may include at least one of identification information of a second cluster with which the at least one external electronic device is synchronized and grade information of the second cluster.

For example, the determining the second adjustment on at least a portion of the function related to execution of the first communication may include adjusting passive scan to be active if the first information does not correspond to the second information, the passive scan being performed during a portion of an interval period between a plurality of discovery window periods of the first cluster.

For example, the determining the second adjustment on at least a portion of the function related to execution of the first communication may further include synchronizing with a second cluster if a first grade of the grade information of the first cluster included in the first information is relatively lower than a second grade of the grade information, which is included in the second information, of the second cluster synchronized with the at least one external electronic device, and after the synchronizing with the second cluster, transmitting a third signal including the second information related to the second cluster based on the second communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
at least one wireless communication circuit configured to perform first communication and second communication of a protocol different from that of the first communication; and
a processor operatively connected to the at least one wireless communication circuit,
wherein the processor is configured to:
synchronize with a first cluster having first information based on the first communication using the at least one wireless communication circuit;
perform first adjustment on at least a portion of a function related to discovery of the first communication;
receive a first signal transmitted from at least one external electronic device based on the second communication using the at least one wireless communication circuit;
obtain, from the first signal, second information of a second cluster associated with the at least one external electronic device; and
determine second adjustment on at least the portion of the function related to discovery of the first communication based on whether the first information of the first cluster and the second information correspond to each other.

2. The electronic device of claim 1, wherein the processor is configured to synchronize with the first cluster based on Bluetooth low energy (BLE) triggering neighbor awareness networking (NAN) communication protocol of NAN specification.

3. The electronic device of claim 1, wherein the first adjustment includes adjusting a passive scan function be deactivated, the passive scan function being performed during at least a portion of an interval period between a plurality of discovery window periods of the first cluster.

4. The electronic device of claim 1,
wherein the processor is configured to transmit a second signal including the first information related to the first cluster based on the second communication using the at least one wireless communication circuit,
wherein the second signal includes a Bluetooth low energy transport discovery service (BLE TDS) packet,
wherein the BLE TDS packet includes the first information.

5. The electronic device of claim 4, wherein the first information includes identification information of the first cluster.

6. The electronic device of claim 1, wherein the first signal includes a BLE TDS packet including the second information.

7. The electronic device of claim 6, wherein the second information includes identification information of the second cluster.

8. The electronic device of claim 6, wherein the processor is configured to perform the second adjustment when the second information does not correspond to the first information.

9. The electronic device of claim 8, wherein the processor is configured to perform the second adjustment by activating a passive scan function during at least a portion of an interval period between a plurality of discovery window periods of the first cluster based on the first communication.

10. The electronic device of claim 9, wherein a first interval of the passive scan function according to the first adjustment is longer than a second interval of the passive scan function according to the second adjustment.

11. The electronic device of claim 10, wherein the processor is configured to:
receive grade information of the second cluster based on the first communication by performing the passive scan function according to the second adjustment; and
determine whether to synchronize with the second cluster based on the grade information of the second cluster and grade information of the first cluster.

12. The electronic device of claim 11, wherein the processor is configured to synchronize with the second cluster when a grade of the first cluster is relatively lower or smaller than a grade of the second cluster.

13. The electronic device of claim 12, wherein the processor is configured to transmit a third signal including information related to the second cluster based on the second communication using the at least one wireless communication circuit, after synchronizing with the second cluster.

14. A neighbor awareness networking (NAN)-based cluster merging method of an electronic device, comprising:
synchronizing with a first cluster based on first communication;
performing first adjustment on at least a portion of a function related to execution of the first communication;
transmitting a first signal including first information related to the first cluster based on second communication of a specification different from that of the first communication;
receiving a second signal transmitted from at least one external electronic device based on the second communication; and
determining second adjustment on at least the portion of the function related to execution of the first communication based on whether the first information of the first signal and second information of the second signal correspond to each other.

15. The NAN-based cluster merging method of claim 14, wherein the synchronizing with the first cluster is based on Bluetooth low energy (BLE) triggering NAN communication protocol of NAN specification.

* * * * *